(12) United States Patent
Lee et al.

(10) Patent No.: US 11,620,755 B2
(45) Date of Patent: Apr. 4, 2023

(54) METHOD AND SYSTEM FOR TRACKING TRAJECTORY BASED ON VISUAL LOCALIZATION AND ODOMETRY

(71) Applicant: NAVER LABS CORPORATION, Seongnam-si (KR)

(72) Inventors: Donghwan Lee, Seongnam-si (KR); Deokhwa Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 203 days.

(21) Appl. No.: 17/095,909

(22) Filed: Nov. 12, 2020

(65) Prior Publication Data

US 2021/0142488 A1    May 13, 2021

(30) Foreign Application Priority Data

Nov. 12, 2019   (KR) .......................... 10-2019-0144126

(51) Int. Cl.
| | | |
|---|---|---|
| *G06K 9/00* | (2022.01) | |
| *G06T 7/20* | (2017.01) | |
| *G06F 17/17* | (2006.01) | |
| *G06T 7/70* | (2017.01) | |

(52) U.S. Cl.
CPC ................ *G06T 7/20* (2013.01); *G06F 17/17* (2013.01); *G06T 7/70* (2017.01); *G06T 2207/30244* (2013.01)

(58) Field of Classification Search
CPC ........................................... G06T 2207/30244
See application file for complete search history.

(56) References Cited

U.S. PATENT DOCUMENTS

| | | | |
|---|---|---|---|
| 9,507,346 B1 * | 11/2016 | Levinson | ............ G06F 3/04847 |
| 9,709,404 B2 * | 7/2017 | Roumeliotis | ........ G06K 9/6267 |
| 2006/0012493 A1 | 1/2006 | Karlsson et al. | |
| 2012/0121161 A1 * | 5/2012 | Eade | .................... G05D 1/0253 |
| | | | 901/1 |
| 2019/0304105 A1 | 10/2019 | Gao et al. | |

FOREIGN PATENT DOCUMENTS

| | | |
|---|---|---|
| JP | 2008071352 A | 3/2008 |
| JP | 2019079171 A | 5/2019 |
| JP | 2019190994 A | 10/2019 |
| KR | 1020100070922 A | 6/2010 |
| KR | 1020190094405 A | 8/2019 |

OTHER PUBLICATIONS

Office Action issued in corresponding Korean patent application No. 10-2019-0144126, dated Mar. 3, 2021.
Hojun Kim et al.; Vehicle Localization based on Vidual Odometry using Reference Image; Proceedings of Korean Society for Geospatial Information Science, 201710, pp. 48-49 (2 pages).
Office Action issued in corresponding Japanese patent application No. 2020-187752, dated Jun. 21, 2022.
Japanese Office Action issued in corresponding to Japanese patent application No. 2020-187752, dated Oct. 19, 2021.

\* cited by examiner

*Primary Examiner* — Hadi Akhavannik
(74) *Attorney, Agent, or Firm* — Greer Burns & Crain Ltd.

(57) ABSTRACT

The trajectory tracking method for a mobile electronic device may include tracking a trajectory of the electronic device by using results of pose estimation using odometry and results of pose estimation using visual localization (VL) as camera pose information.

9 Claims, 11 Drawing Sheets

· t = 1

· t = 1

· t = 1

· t = 3

· t = 4

---------- groundtruth
_____ odometry + VL initial pose
— - — - — VL results
·················· optimized pose

METHOD AND SYSTEM FOR TRACKING TRAJECTORY BASED ON VISUAL LOCALIZATION AND ODOMETRY

CROSS-REFERENCE TO RELATED APPLICATION

This application claims priority under 35 U.S.C. § 119 to Korean Patent Application No. 10-2019-0144126 filed on Nov. 12, 2019, which is incorporated herein by reference in its entirety.

BACKGROUND OF THE INVENTION

1. Field of Invention

The following description relates to a trajectory tracking technology for an indoor navigation device.

2. Description of Related Art

A mobile robot needs to be able to identify its own location within a given environment and to autonomously write a map for surrounding screens when the mobile robot is placed in a new environment that the mobile robot has not previously experienced.

Map writing of the mobile robot means a task for finding out a location where a surrounding obstacle or object is placed, an open space where the mobile robot can freely move, etc. and memorizing the location, space, etc.

As an example of a map writing technology of a mobile robot, Korean Patent Application Publication No. 10-2010-0070922 (Jun. 28, 2010) discloses a technology capable of writing the final grid map for enabling a mobile robot to recognize a location by writing a grid map based on distance information up to a surrounding object and then associating the grid map with location information of a landmark.

BRIEF SUMMARY OF THE INVENTION

Embodiments may provide a positioning technology in which a visual localization (VL) technology and an odometry technology are combined.

Furthermore, embodiments may provide a method and a system capable of generating an optimized trajectory using a pose of VL and a pose of odometry.

In an embodiment, there is provided a trajectory tracking method executed in a computer system. The computer system includes at least one processor configured to execute computer-readable instructions included in a memory. The trajectory tracking method may include tracking, by the at least one processor, a trajectory by using results of pose estimation using odometry and results of pose estimation using visual localization (VL) as camera pose information.

According to an aspect, wherein tracking a trajectory may include correcting a relative pose, estimated using the odometry, using an absolute pose estimated using the VL. [ono] According to another aspect, tracking a trajectory may include correcting an accumulated error, occurring when the pose is estimated using the odometry, based on a pose value estimated using the VL.

According to still another aspect, tracking a trajectory may include defining, as nodes, a relative pose estimated using the odometry and an absolute pose estimated using the VL, and optimizing a pose graph in which a difference between poses of the nodes is defined as an edge.

According to still another aspect, optimizing a pose graph may include correcting a relative pose value, estimated at a given timing or predetermined given interval in the pose graph, using an absolute pose value estimated at the given timing.

According to still another aspect, optimizing a pose graph may include optimizing the pose graph in a way to minimize an error between a relative pose value, estimated at a given timing or predetermined given interval in the pose graph, and an absolute pose value estimated at the given timing.

According to still another aspect, optimizing a pose graph may include defining a pose-graph error function by summing errors of all edges included in the pose graph, and estimating a pose value of each of the nodes using a Gauss-Newton method based on the pose-graph error function.

According to still another aspect, the trajectory tracking method may further include estimating, by the at least one processor, the pose by additionally using a visual object tracking (VOT) technology depending on whether the VL operates or based on the result of the pose estimation using the VL.

In an embodiment, there is provided a non-transitory computer-readable recording medium in which a program for executing the trajectory tracking method in a computer is written.

In an embodiment, there is provided a computer system including at least one processor configured to execute computer-readable instructions included in a memory. The at least one processor tracks a trajectory by using results of pose estimation using odometry and results of pose estimation using visual localization (VL) as camera pose information.

DETAILED DESCRIPTION OF THE INVENTION

Hereinafter, embodiments of the present disclosure are described in detail with reference to the accompanying drawings.

Embodiments of the present disclosure relate to a camera-based positioning technology.

Embodiments including contents specifically disclosed in this specification may provide a positioning technology in which a VL technology and an odometry technology have been merged, and can improve a computational load of positioning and positioning accuracy by overcoming the limits of the existing positioning technology using the positioning technology and can be used in various devices.

Figure 1:
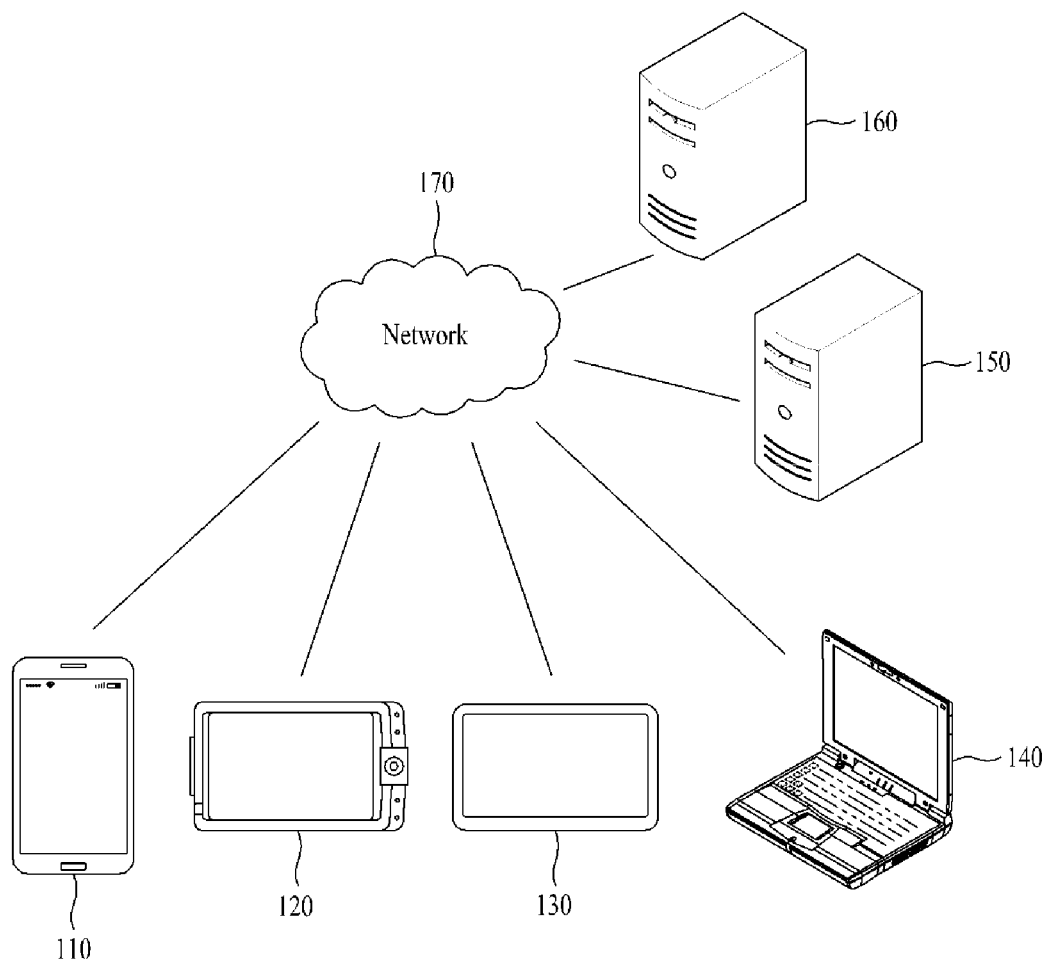
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. In FIG. 1, the number of electronic devices or the number of servers, that is, an example for describing the present disclosure, is not limited to that of FIG. 1.

Each of the plurality of electronic devices 110, 120, 130 and 140 may be a stationary terminal or a mobile terminal implemented as a computer system. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, a game console, a wearable device, an Internet of things (IoT) device, a virtual reality (VR) device, an augmented reality (AR) device. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, a broadcasting network and a satellite network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides a first service to the plurality of electronic devices 110, 120, 130, and 140 connected thereto over the network 170. The server 160 may be a system that provides a second service to the plurality of electronic devices 110, 120, 130, and 140 connected thereto over the network 170. As a more detailed example, the server 150 may provide the plurality of electronic devices 110, 120, 130, and 140 with a service (e.g., a location-based service), targeted by a corresponding application, as the first service through an application as a computer program installed and driven in the plurality of electronic devices 110, 120, 130, and 140. For another example, the server 160 may provide, as the second service, a service for distributing a file for installing and driving the aforementioned application to the plurality of electronic devices 110, 120, 130, and 140.

Figure 2:
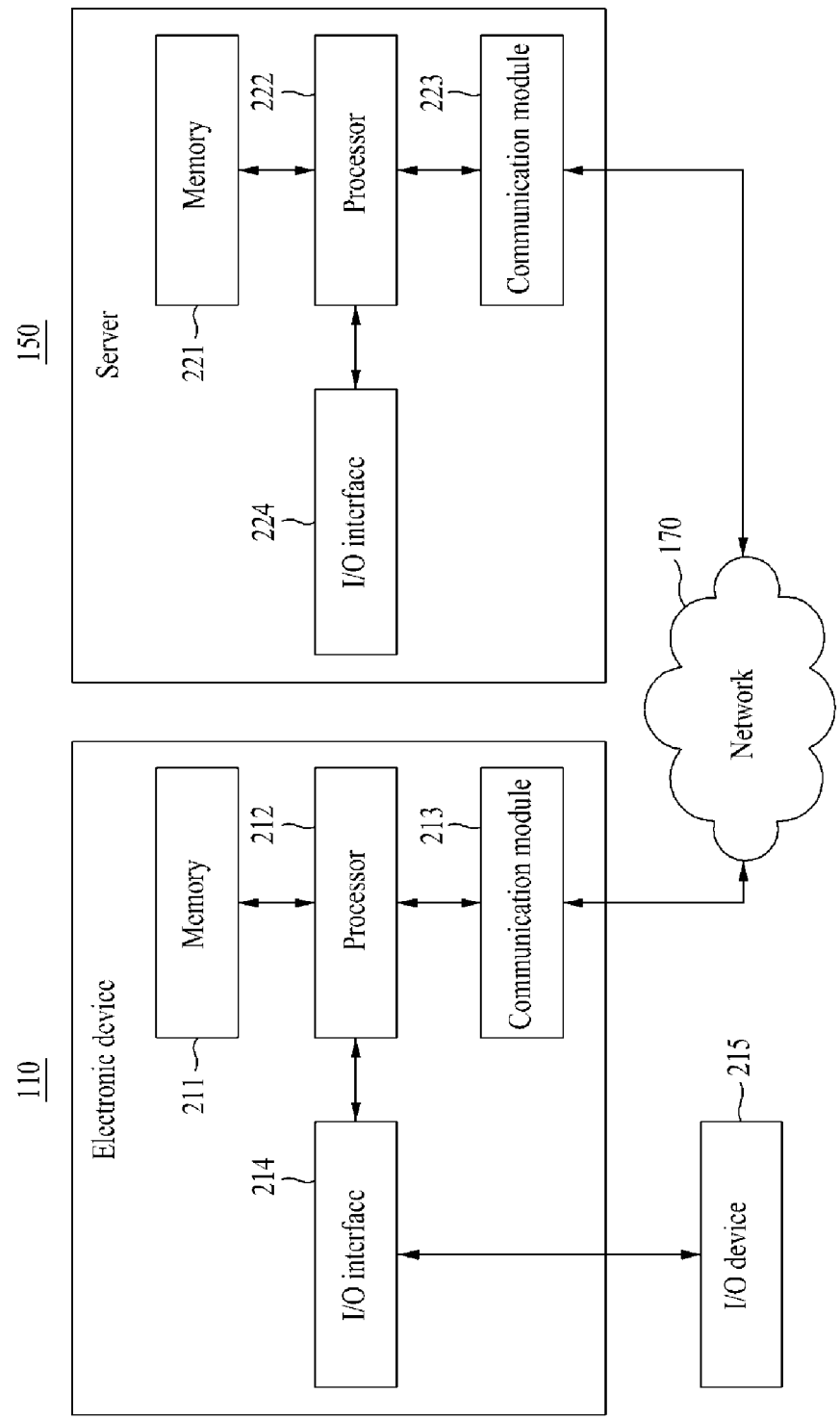
FIG. 2 is a block diagram for describing internal components of an electronic device and a server according to an embodiment of the present disclosure.

FIG. 2 is a block diagram for describing internal components of an electronic device and a server according to an embodiment of the present disclosure. FIG. 2 is an example of the electronic device and describes internal elements of the electronic device 110 and the server 150. Furthermore, each of other electronic devices 120, 130, and 140 or the server 160 may have the same or similar elements as those of the electronic device 110 or the server 150.

The electronic device 110 and the server 150 may include memories 211 and 221, processors 212 and 222, communication modules 213 and 223, and input and output (I/O) interfaces 214 and 224, respectively. Each of the memories 211 and 221 is a non-transitory computer-readable recording medium, and may include permanent mass storage devices, such as a random access memory (RAM), a read only memory (ROM), a disk drive, a solid state drive (SSD), and a flash memory. In this case, a permanent mass storage device, such as the ROM, the SSD, the flash memory or the disk drive, separate from the memory 211, 221, may also be included in the electronic device 110 or the server 150. Furthermore, the memory 211, 221 may store an operating system and at least one program code (e.g., a code for a browser installed and driven in the electronic device 110 or an application installed in the electronic device 110 in order to provide a specific service). Such software elements may be loaded from a separate computer-readable recording medium different from the memory 211, 221. Such a separate computer-readable recording medium may include computer-readable recording media, such as a floppy drive, a disk, a tape, a DVD/CD-ROM drive, and a memory card. In other embodiments, the software elements may be loaded onto the memory 211, 221 through the communication module 213, 223 not a computer-readable recording medium. For example, at least one program may be loaded onto the memory 211, 221 based on a computer program (e.g., the aforementioned application) installed by files provided, over the network 170, by developers or a file distribution system (e.g., the aforementioned server 160) that distributes the file for installing an application.

The processor 212, 222 may be configured to process instructions of a computer program by performing basic arithmetic, logic and I/O operations. The instructions may be provided from the memory 211, 221 or the communication module 213, 223 to the processor 212, 222. For example, the processor 212, 222 may be configured to execute received instructions based on a program code stored in a recording device, such as the memory 211, 221.

The communication module 213, 223 may provide a function for communication between the electronic device 110 and the server 150 over the network 170, and may provide a function that enables the electronic device 110 and/or the server 150 to communicate with another electronic device (e.g., the electronic device 120) or another server (e.g., the server 160). For example, a request generated by the processor 212 of the electronic device 110 in response to a program code stored in a recording device, such as the memory 211, may be transmitted to the server 150 over the network 170 under the control of the communication module 213. Inversely, a control signal, an instruction, content, a file, etc. provided under the control of the processor 222 of the server 150 may be received by the electronic device 110 through the communication module 213 of the electronic device 110 through the communication module 223 and the network 170. For example, a control signal, an instruction, content, a file, etc. of the server 150 received through the communication module 213 may be transmitted to the processor 212 or the memory 211, and content, a file, etc. of the server 150 received through the communication module 213 may be stored in a storage medium (the aforementioned permanent storage device) which may be further included in the electronic device 110.

The I/O interface 214 may be means for interfacing with the I/O device 215. For example, an input device of the I/O device 215 may include devices, such as a keyboard, a mouse, a microphone, and a camera. An output device of the I/O device 215 may include devices, such as a display, a speaker, and a haptic feedback device. For another example, the I/O interface 214 may be means for interfacing with a device in which functions for an input and an output are integrated into one, like a touch screen. The I/O device 215, together with the electronic device 110, may be configured into a single device. Furthermore, the I/O interface 224 of the server 150 may be means for interfacing with a device (not illustrated) for an input or output, which is connected to the server 150 or which may be included in the server 150. As a more detailed example, when the processor 212 of the electronic device 110 processes instructions of a computer program loaded onto the memory 211, a service screen or content configured using data provided by the server 150 or the electronic device 120 may be displayed on a display through the I/O interface 214.

Furthermore, in other embodiments, each of the electronic device 110 and the server 150 may include more elements than those of FIG. 2. However, most of conventional technological elements do not need to be clearly illustrated. For example, the electronic device 110 may be implemented to include at least some of the aforementioned I/O devices 215 or may further include other elements, such as a transceiver, a global positioning system (GPS) module, a camera, various sensors, and a database. As a more detailed example, if the electronic device 110 is a smart phone, in general, the electronic device 110 may be implemented to further include various elements, such as an acceleration sensor, a gyro sensor, a camera module, various physical buttons, buttons using a touch panel, an I/O port, and a vibrator for vibration which are typically included in a smart phone.

First, a process of computing a pose, that is, performing VL, based on an image is described. A pose refers to spatial information including a 3-axis position value and a 3-axis direction value. For example, in the case of a camera space, the pose information may be defined, based on the coordinate axis of the world space, as the coordinates of the reference point corresponding to the origin of the camera space, and a direction vector indicating the direction when the camera looks at the world.

Figure 3:
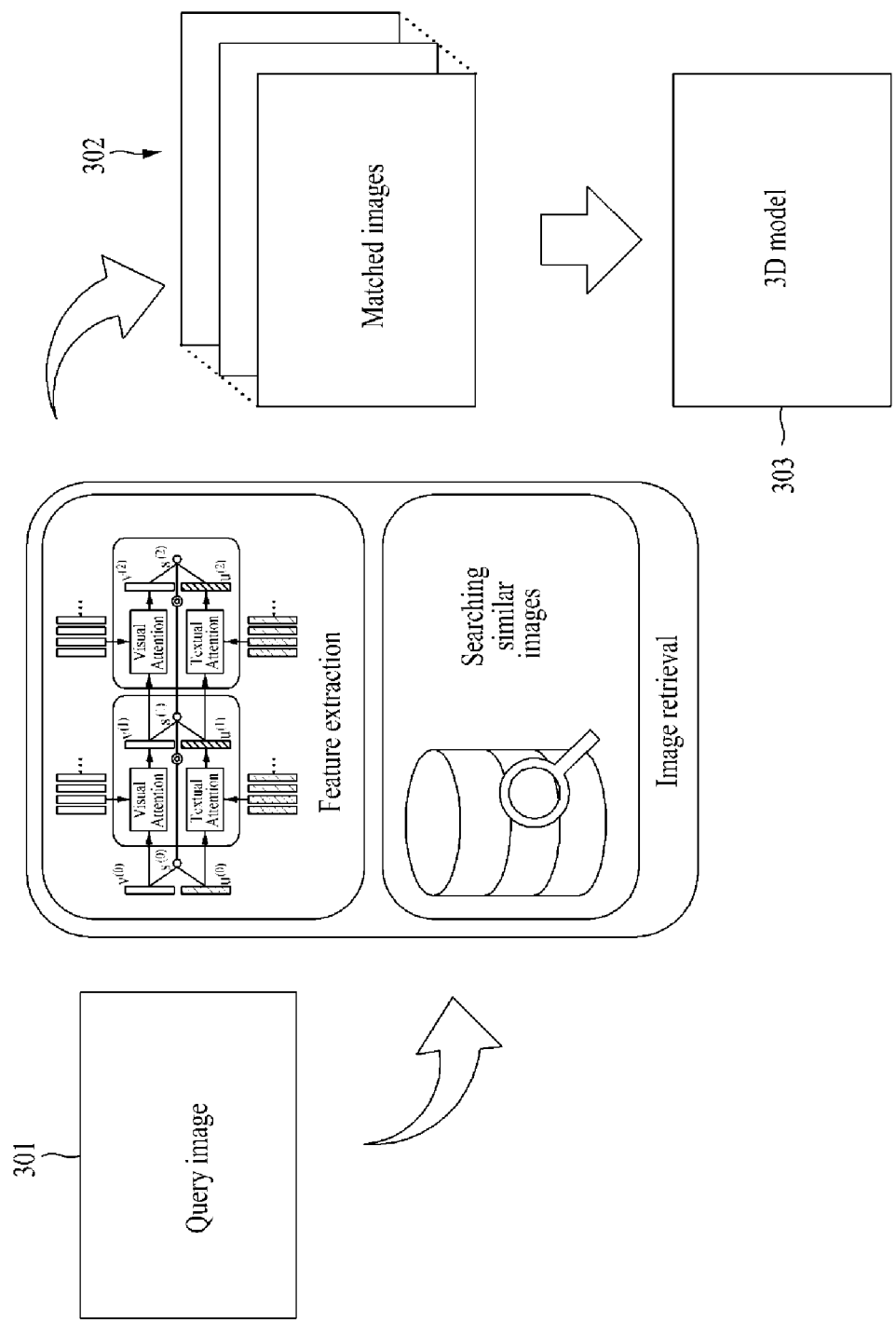
FIGS. 3 and 4 are diagrams for describing a process of performing visual localization (VL).
Figure 4:
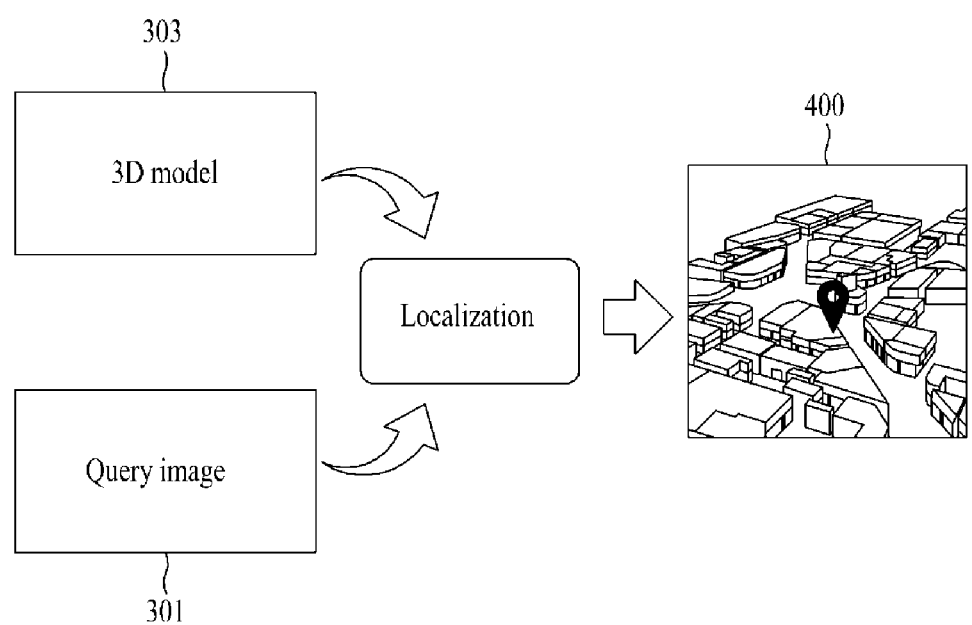

FIGS. 3 and 4 are diagrams for describing an example of a VL process.

VL is a technology for finding or obtaining an absolute location using a sheet of or several sheets of images.

The server 150 may previously configure and maintain a map 400 for VL corresponding to a 3D model using geo-tagged images of a target space.

As illustrated in FIG. 3, when receiving, as a query image 301, an image photographed by the electronic device 100 (e.g., a mobile terminal or a mobile robot), the server 150 may extract reference images 302 similar to the query image 301 from a map database (e.g., the memory 221) for VL. In this case, the server 150 may search for the reference images 302 using a global feature, after extracting the global feature from the query image 301 through a deep learning model.

As illustrated in FIG. 4, the server 150 may estimate a 6-freedom degree pose (i.e., location and direction) of the query image 301 through localization using the query image 301 along with a 3D model 303 corresponding to the reference image 302. In other words, the server 150 may check absolute coordinates as a point corresponding to the query image 301 in a map 400 for VL by performing VL using data onto which a pose has been tagged.

As described above, in order to compute a camera pose (including a 3-axis location value and a 3-axis direction value) based on an image, that is, in order to perform VL, after a target space is previously scanned using data collection equipment, the map 400 for VL may be generated by processing data (onto which a pose has been tagged) obtained through the scanning.

In other words, VL, that is, an image-based positioning technology, performs positioning using a method of previously constructing the map 400 for VL and estimating a location within the constructed map 400 for VL.

In such a VL technology, an absolute location can be made aware, and a drift phenomenon in which errors are accumulated over time does not occur. However, the VL technology has disadvantages in that precise positioning in a mobile situation is difficult and a long computation time is taken due to a great computational load because a change in various environments must be handled.

For precise positioning in a mobile situation, an odometry technology capable of real-time location tracking may be used. The odometry technology may include visual-inertial odometry (VIO), wheel odometry (WO), etc., and performs positioning using a method of calculating a relative location based on an image or rotation information of a wheel.

Such an odometry technology may be performed in a low-specification computer system, for example, the electronic device 110, 120, 130, or 140, such as a smartphone, because a relative pose can be smoothly estimated and the amount of calculation is relatively small, but has disadvantages in that only a change in a relative location can be estimated and a drift phenomenon occurs.

Hereinafter, detailed embodiments of a trajectory tracking method and system based on VL and odometry, as a positioning technology in which the VL technology and the odometry technology are combined, are described.

Figure 5:
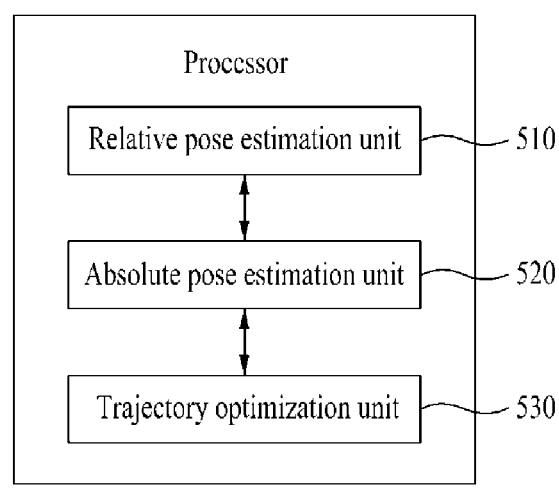
FIG. 5 is a block diagram illustrating an example of components which may be included in the processor of the server according to an embodiment of the present disclosure.
Figure 6:
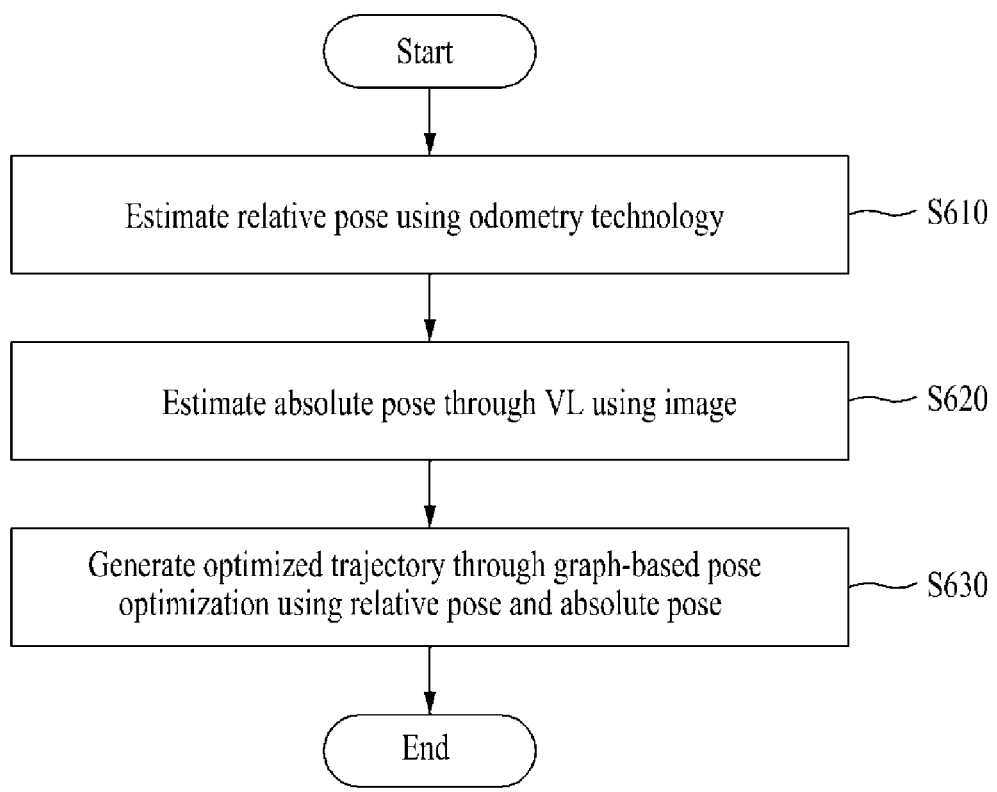
FIG. 6 is a flowchart illustrating an example of a method which may be performed by the server according to an embodiment of the present disclosure.

FIG. 5 is a block diagram illustrating an example of components which may be included in the processor 222 of the server 150 according to an embodiment of the present disclosure. FIG. 6 is a flowchart illustrating an example of a method which may be performed by the server 150 according to an embodiment of the present disclosure.

The server 150 according to the present embodiment may provide a location-based service. In particular, the server 150 may provide a location-based service based on a positioning technology in which the VL technology and the odometry technology are combined.

The processor 222 of the server 150 is a component for performing a trajectory tracking method of FIG. 6. As illustrated in FIG. 5, the processor 222 may include a relative pose estimation unit 510, an absolute pose estimation unit 520, and a trajectory optimization unit 530. In some embodiments, the components of the processor 222 may be selectively included in the processor 222 or may be selectively excluded from the processor 222. Furthermore, in some embodiments, the components of the processor 222 may be separated or merged in order to express a function of the processor 222.

The processor 222 and the components of the processor 222 may control the server 150 to perform steps S610 to S630 included in the trajectory tracking method of FIG. 6. For example, the processor 222 and the components of the processor 222 may be implemented to execute instructions according to a code of an operating system and a code of at least one program included in the memory 221.

In this case, the components, i.e., the relative pose estimation unit 510, the absolute pose estimation unit 520, and the trajectory optimization unit 530, of the processor 222 may be expressions of different functions of the processor 222 performed by the processor 222 in response to instructions provided by a program code stored in the server 150. For example, the relative pose estimation unit 510 may be used as a functional expression of the processor 222 that controls the server 150 to estimate a relative pose in response to the aforementioned instructions.

The processor 222 may read required instructions from the memory 221 onto which instructions related to control of the server 150 are loaded. In this case, the read instructions may include instructions for controlling the processor 222 to execute steps S610 to S630 to be described later.

At step S610, the relative pose estimation unit 510 may estimate a relative pose as camera pose information (including a 3-axis location value and a 3-axis direction value) using an odometry technology, such as VIO or WO. The relative pose estimation unit 510 may receive continuous sensor information (e.g., continuous images or rotation information of a wheel) as query information generated from the electronic device 110, and may compute a relative pose relation between pieces of continuous sensor information.

At step S620, the absolute pose estimation unit 520 may estimate an absolute pose as camera pose information through localization using an image, that is, VL. The absolute pose estimation unit 520 may receive a query image as query information generated from the electronic device 110, and may estimate a 6-freedom degree pose (location and direction) of the query image received through VL. The absolute pose estimation unit 520 may estimate a point corresponding to the query image on the map 400 for VL that has been previously constructed, that is, the absolute pose, by performing VL using data onto which a pose has been tagged.

At step S630, the trajectory optimization unit 530 may generate an optimized trajectory through graph-based pose optimization using the relative pose estimated at step S610 and the absolute pose estimated at step S620, and may track a trajectory as the final pose whose error has been corrected. If a pose is estimated using only the odometry technology, an accumulated error may occur due to the drift phenomenon. If a pose is estimated using only VL, the reliability of an estimated value may be deteriorated because a range of an error is great compared to the odometry technology. In order to overcome the disadvantages of the odometry technology and the VL technology, the trajectory optimization unit 530 may estimate a precise pose by applying an optimization algorithm in which continuous local pose information estimated through odometry and global pose information estimated through VL are merged.

Figure 7:
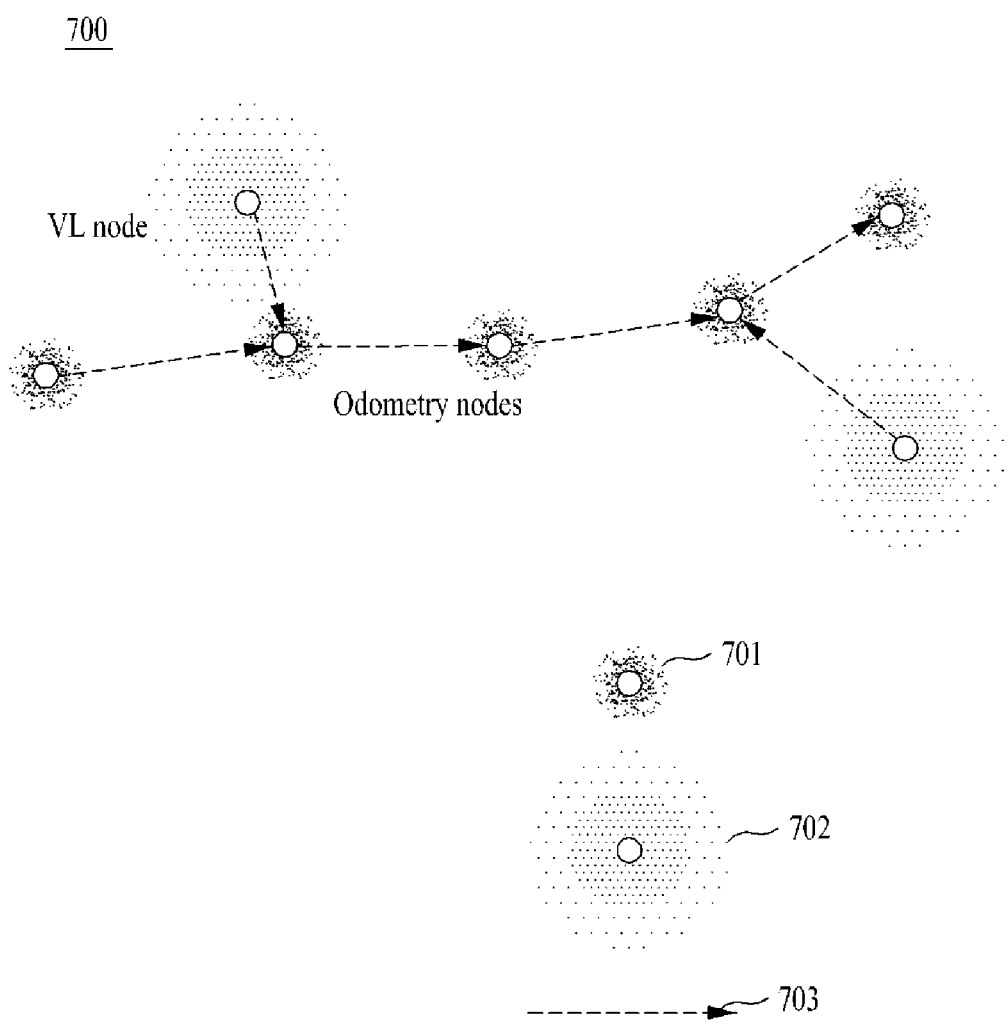
FIG. 7 illustrates an example of a pose graph that represents a pose of VL and a pose of odometry according to an embodiment of the present disclosure.

The trajectory optimization unit 530 may generate an optimized trajectory through graph-based pose optimization using the results of pose estimation based on odometry and the results of pose estimation based on VL. FIG. 7 illustrates an example of a pose graph 700. As illustrated in FIG. 7, the pose graph 700 may be composed of a node (hereinafter referred to as an "odometry node") 701 indicative of a relative pose estimated from odometry and a node (hereinafter referred to as a "VL node") 702 indicative of an absolute pose estimated from VL. A difference between relative poses and a difference between a relative pose and an absolute pose may be represented as an edge 703 that connects corresponding nodes. An error of the edge 703 indicative of a pose difference between the odometry node 701 and the odometry node 701, for example, the difference between the odometry node 701 estimated at the present time and the odometry node 701 estimated at a previous time, or a pose difference between the VL node 702 and the odometry node 701 may be defined by Equation 1.

$$e(x_i, x_j, [R|t]_i^j) = t2v(x_j^{-1} \times (x_i \times [R|t]_i^j)) \quad (1)$$

wherein $x_*$ means a node including pose information. $[R|t]$ means pose information (R is rotation, and t is translation) between nodes connected by an edge. Furthermore, $t2v(*)$ means a function of deforming a transformation matrix into a 1×6 vector, and may chiefly use a screw displacement scheme.

The screw displacement scheme may be defined by Equation 2.

$$T = \begin{bmatrix} R & t \\ 0 & 1 \end{bmatrix} = \exp(\hat{\xi}) = \exp\left(\begin{bmatrix} 0 & -w_z & w_y & v_x \\ w_z & 0 & -w_x & v_y \\ -w_y & w_x & 0 & v_z \\ 0 & 0 & 0 & 0 \end{bmatrix}\right) \xi = [w_x, w_y, w_z, v_x, v_y, v_z]^T \quad (2)$$

wherein R is a rotation matrix, and t is a translation vector. Furthermore, $\xi$ means a twist vector, $w_*$ means a rotation velocity, and $v_*$ means a linear velocity.

If errors of all the edges 703 included in the pose graph 700 are added up, a pose-graph error function ($f(\cdot)$) may be defined by Equation 3.

$$f(\cdot) = \Sigma_k e_k^T \Omega_k e_k \quad (3)$$

wherein $\Omega$ means a covariance of the edge.

The trajectory optimization unit 530 may recursively estimate a pose value (x*, l*) of the node 701, 702 using a Gauss-Newton method in such a manner that an error of the pose-graph error function is reduced as in Equation 4.

$$x^*, l^* = \operatorname{argmin}_x \Sigma_k e_k^T \Omega_k e_k \quad (4)$$

In an optimized pose graph, the relative pose value (x*) and the absolute pose value (l*) may be defined as the nodes 701 and 702, and a pose difference ([R|t]) between the nodes and the covariance ($\Omega$) may be defined as the edge 703.

Figure 8:
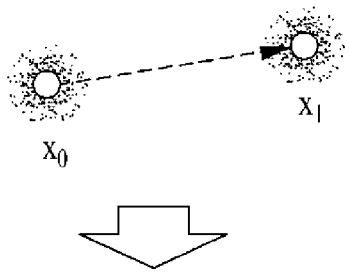
FIGS. 8 to 10 are diagrams for describing a pose optimization process based on a graph according to an embodiment of the present disclosure.
Figure 8:
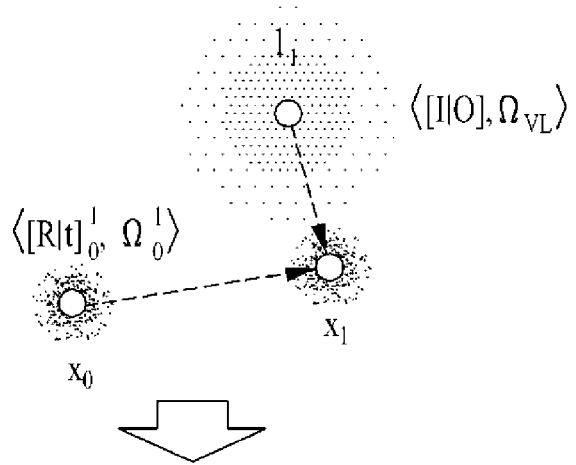
Figure 8:
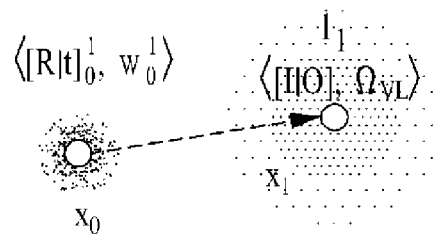
Figure 9:
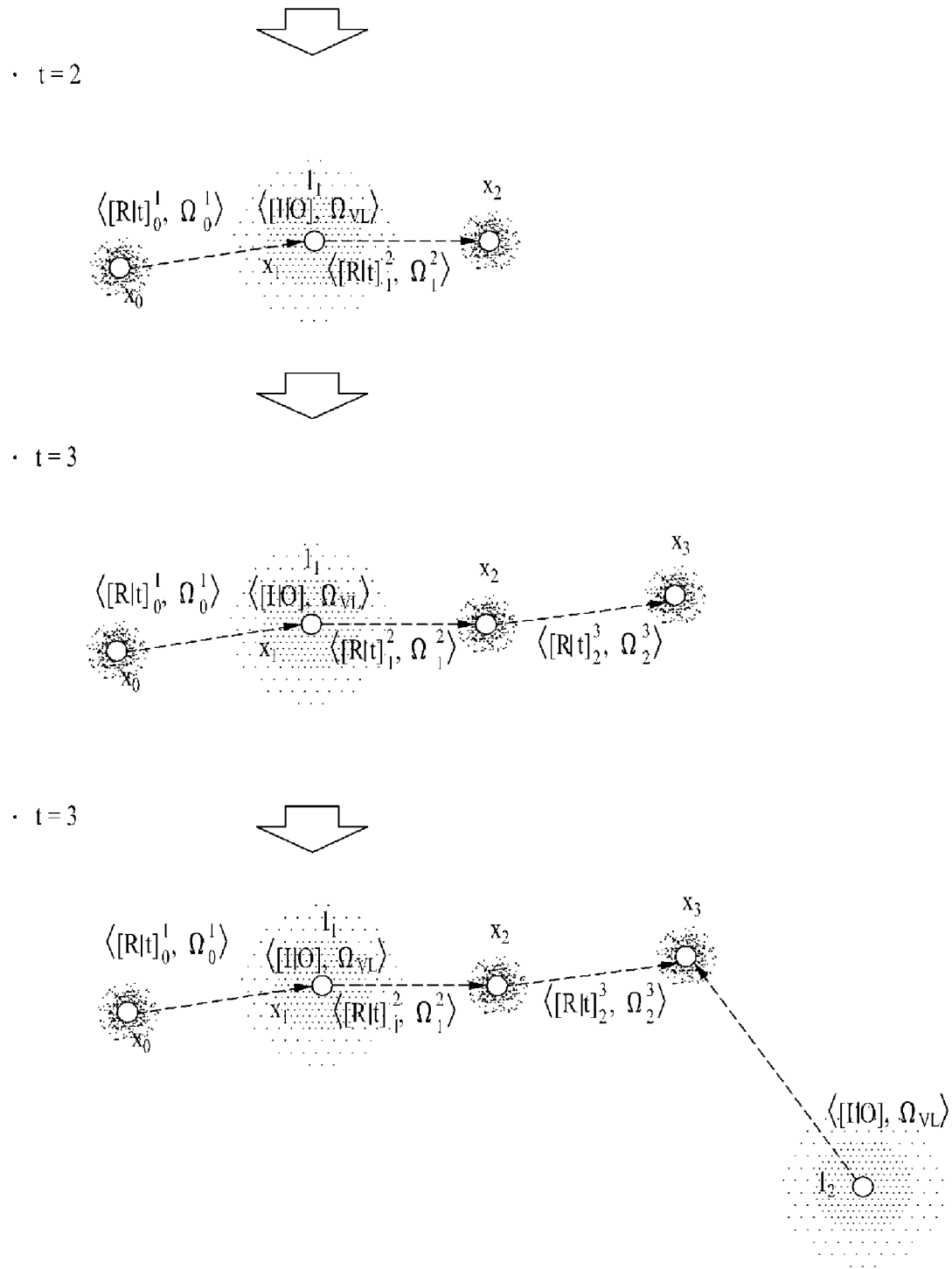
Figure 10:
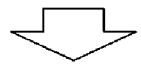
Figure 10:
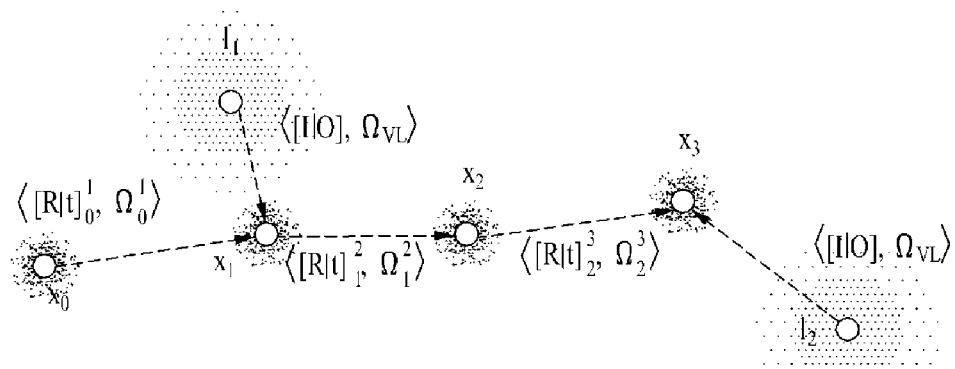
Figure 10:
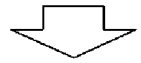
Figure 10:
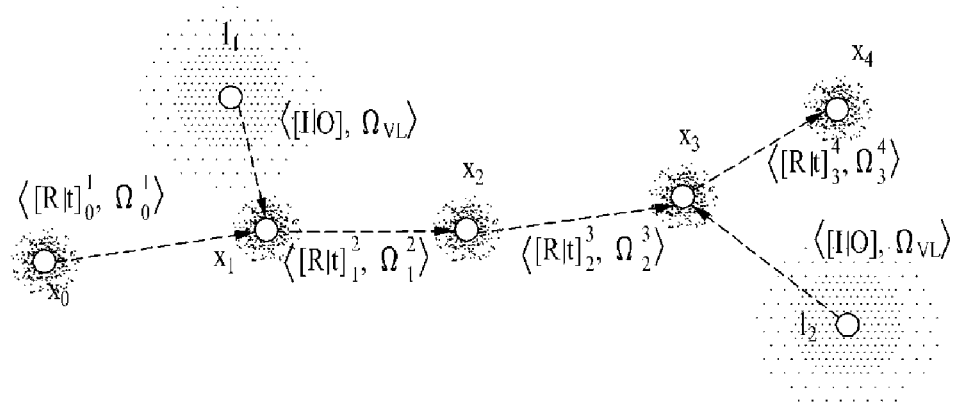

FIGS. 8 to 10 are diagrams for describing a trajectory optimization process using the relative pose (x*) and the absolute pose (l*).

Referring to FIG. 8, the trajectory optimization unit 530 may correct a relative pose value ($x_1$) at timing t=1 by requesting an absolute pose value ($l_1$), estimated at the timing t=1, with respect to the relative pose value ($x_1$) estimated at the timing t=1 based on a relative pose value ($x_0$) estimated at timing t=0. In this case, the trajectory optimization unit 530 may optimize the relative pose value ($x_1$) at the timing t=1 in a way to minimize an error between the relative pose value ($x_1$) at the timing t=1 and the absolute pose value ($l_1$) obtained at the timing t=1.

Referring to FIG. 9, the trajectory optimization unit 530 may correct a relative pose value ($x_3$) at timing t=3 by requesting an absolute pose value ($l_2$), estimated at the timing t=3, with respect to the relative pose value ($x_3$) estimated at the timing t=3, after a relative pose value ($x_2$) estimated at timing t=2 based on the optimized pose value at the timing t=1. In this case, the trajectory optimization unit 530 may optimize the relative pose value ($x_3$) at the timing t=3 in a way to minimize an error between the relative pose value ($x_3$) at the timing t=3 and the absolute pose value (12) obtained at the timing t=3.

Referring to FIG. 10, the trajectory optimization unit 530 may repeat the same pose optimization process after a relative pose value ($x_4$) estimated at timing t=4 based on the optimized pose value at the timing t=3.

In order to correct an accumulated error of the relative pose ($x^*$) estimated from odometry, the trajectory optimization unit 530 may request the absolute pose ($l^*$) estimated from VL at a given timing or predetermined given interval.

The trajectory optimization unit 530 can improve pose estimation accuracy by optimizing a trajectory between poses through a graph structure using the relative pose ($x^*$) and the absolute pose ($l^*$).

Pose estimation accuracy can be improved through pose graph optimization. An influence on an accumulated error can be corrected because the relative pose ($x^*$) that is, a pose estimated from odometry, is influenced by a pose estimated from VL, that is, the absolute pose ($l^*$).

There is an effect in that a pose is smoothed because the pose value ($l^*$) estimated from VL is not used for an application without any change, but the pose value ($x^*$) whose accumulated error has been corrected based on the pose value ($l^*$) estimated from VL is used.

Figure 11:
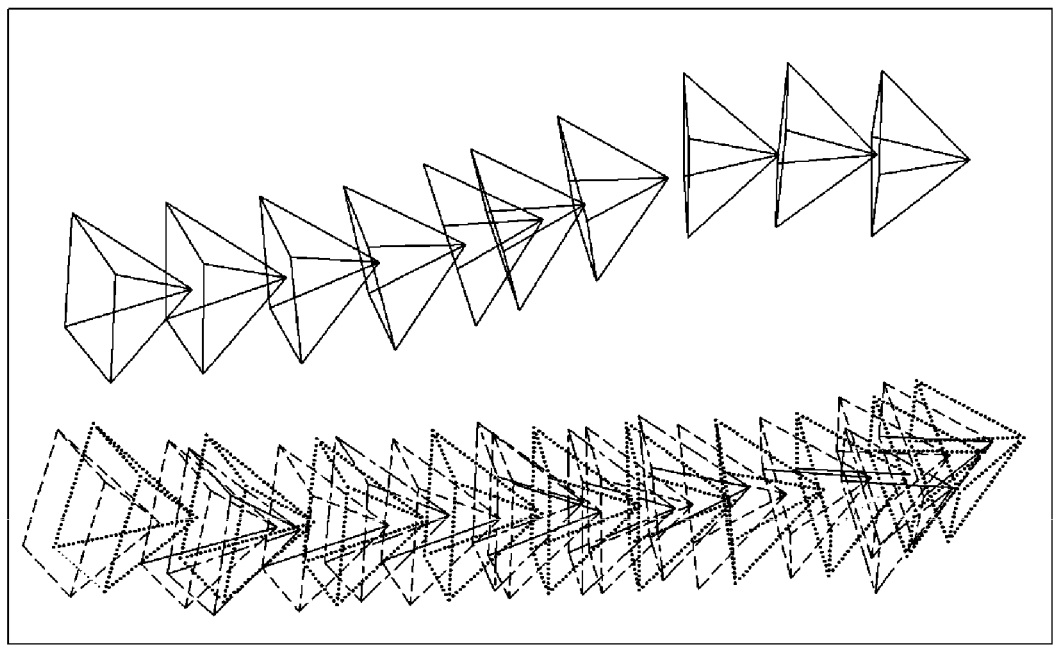
FIG. 11 illustrates experiment results of an optimized pose according to an embodiment of the present disclosure.

When viewing the graph showing the results of pose estimation illustrated in FIG. 11, according to the present embodiment, results in which an optimized pose becomes closer to a ground truth by merging VL and odometry can be obtained.

In the present embodiment, positioning accuracy can be improved by merging the VL technology, the odometry technology, and the optimization algorithm. Moreover, a visual object tracking (VOT) technology may be additionally used as one of positioning technologies in which a mobile situation has been considered. In this case, the VOT technology is a technology capable of estimating the location or direction of an object with 6 degrees of freedom based on the image recognition technology. A 6-freedom degree pose may be estimated by additionally using the VOT technology depending on whether VL operates or based on the results of pose estimation of VL. For example, if VL does not properly operate or in an environment in which the results of a pose are inaccurate, positioning may be performed using an object or marker whose pose has been previously identified using the VOT technology.

It has been described that the trajectory tracking method according to the present embodiment is performed by the server 150, but the present disclosure is not limited thereto. The trajectory tracking method of FIG. 6 may be performed by the electronic device 110 through interoperation with the server 150. In an interoperation environment, some of the processes of the trajectory tracking method may be performed by the server 150 and the remaining processes may be performed by the electronic device 110. For example, pose estimation using VL may be performed by the server 150, and pose estimation using odometry may be performed by the electronic device 110. In this case, the trajectory optimization process may be performed by either the server 150 or the electronic device 110.

As described above, according to embodiments of the present disclosure, the results of high accuracy positioning can be provided through a proper computational load because a trajectory is optimized using the results of a pose of VL and the results of a pose of odometry. Furthermore, according to embodiments of the present disclosure, the positioning technology in which the VL technology and the odometry technology are merged can be applied to mobile devices, such as smartphones, and various devices, such as mobile robots, walking robots, and vehicle, because seamless real-time positioning in a mobile situation is possible using only the least network and a low-specification camera.

The aforementioned device may be implemented by a hardware component, a software component and/or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. A processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiments may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server.

According to embodiments of the present disclosure, the results of high accuracy positioning results can be provided through a proper computational load because trajectory optimization is performed using a pose of VL and a pose of odometry.

According to embodiments of the present disclosure, seamless real-time positioning in a mobile situation is possible using minimal network resource and a low-specification camera through positioning in which the VL technology and the odometry technology are merged.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents. Accordingly, other implementations, other embodiments, and equivalents of the claims fall within the scope of the claims.

What is claimed is:

1. A trajectory tracking method, executed in a computer system, for a mobile electronic device wherein:
   the computer system comprises at least one processor configured to execute computer-readable instructions included in a memory, and
   the trajectory tracking method comprises
      estimating a relative pose of the electronic device using odometry, a relative pose value of the relative pose being estimated based on a relative pose value of a prior relative pose of the electronic device;
      estimating an absolute pose of the electronic device using visual localization (VL) as camera pose information;
      generating a pose graph including a node defined by the relative pose, a node defined by the absolute pose and an edge defining a difference between the relative pose and the absolute pose; and
      optimizing the pose graph by correcting the relative pose value of the relative pose, estimated at a given timing in the pose graph, using an absolute pose value of the absolute pose estimated at the given timing, to minimize an error between the relative pose and the absolute pose at the given timing.

2. The trajectory tracking method of claim 1, wherein tracking a trajectory comprises correcting an accumulated error, occurring when the relative pose is estimated using the odometry, based on the absolute pose value estimated using the VL.

3. The trajectory tracking method of claim 1, wherein optimizing of the pose graph comprises:
   defining a pose-graph error function by summing errors of all edges included in the pose graph; and
   estimating the relative pose value and the absolute pose value of each of the nodes defined by the relative pose and absolute pose using a Gauss-Newton method based on the pose-graph error function.

4. The trajectory tracking method of claim 1, further comprising estimating, by the at least one processor, the absolute pose by additionally using a visual object tracking (VOT) technology depending on whether the VL operates or based on the result of the absolute pose estimation using the VL.

5. A non-transitory computer-readable recording medium storing a program which, when executed by at least one processor, causes the at least one processor to execute the trajectory tracking method of claim 1.

6. A computer system for tracking a trajectory of a mobile electronic device, comprising:
   at least one processor configured to execute computer-readable instructions included in a memory,
   wherein the at least one processor includes,
      a relative pose estimation unit for estimating a relative pose of the electronic device using odometry;
      an absolute pose estimation unit for estimating an absolute pose of the electronic device using visual localization (VL) as camera pose information; and
      a trajectory optimization unit for generating a pose graph including a node defined by the relative pose, a node defined by the absolute pose and an edge defining a difference between the relative pose and the absolute pose, and optimizing the pose graph by correcting a relative pose value of the relative pose, estimated at a given timing in the pose graph, using an absolute pose value of the absolute pose estimated at the given timing based on a relative pose value of a prior relative pose of the electronic device, to minimize an error between the relative pose and the absolute pose at the given timing.

7. The computer system of claim 6, wherein the at least one processor corrects an accumulated error, occurring when the relative pose is estimated using the odometry, based on the absolute pose value estimated using the VL.

8. The computer system of claim 6, wherein the optimizing of the pose graph comprises,
   defining a pose-graph error function by summing errors of all the edges included in the pose graph and estimating a pose value and the absolute pose value of each of the nodes defined by the relative pose and absolute pose using a Gauss-Newton method based on the pose-graph error function.

9. The computer system of claim 6, wherein the at least one processor further estimates the absolute pose by additionally using a visual object tracking (VOT) technology depending on whether the VL operates or based on the result of the absolute pose estimation using the VL.

* * * * *